(12) United States Patent
Feng

(10) Patent No.: US 6,429,953 B1
(45) Date of Patent: Aug. 6, 2002

(54) SUPER RESOLUTION SCANNING USING COLOR MULTIPLEXING OF IMAGE CAPTURE DEVICES

(75) Inventor: Xiao-fan Feng, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/309,089

(22) Filed: May 10, 1999

(51) Int. Cl.[7] ................................................. G06F 3/08
(52) U.S. Cl. ...................... 358/520; 348/234; 348/265; 345/152; 358/482; 358/483
(58) Field of Search ................................ 358/520, 506, 358/505, 509, 514, 521, 425, 445, 483, 482, 515, 527; 250/208.11; 348/96, 97; 382/162, 167

(56) References Cited

U.S. PATENT DOCUMENTS

| | | | |
|---|---|---|---|
| 3,852,520 A | * | 12/1974 | Bruch |
| 4,553,176 A | * | 11/1985 | Mendrala |
| 4,575,769 A | * | 3/1986 | Arnoldi |
| 4,877,310 A | * | 10/1989 | Seachman et al. |
| 5,045,932 A | * | 9/1991 | Sharman et al. |
| 5,159,469 A | * | 10/1992 | Takagi |
| 5,233,411 A | * | 8/1993 | Nam et al. |
| 5,262,631 A | * | 11/1993 | Yamamoto et al. |
| 5,262,849 A | * | 11/1993 | Mimura et al. |
| 5,469,218 A | * | 11/1995 | Sakaegi et al. |
| 5,477,345 A | * | 12/1995 | Tse |
| 5,550,653 A | * | 8/1996 | TeWinkle et al. |
| 5,587,746 A | * | 12/1996 | Nakakuki |
| 5,619,590 A | * | 4/1997 | Moore, Jr. |
| 5,691,819 A | * | 11/1997 | Uchida et al. |
| 5,767,987 A | * | 6/1998 | Wolff et al. |
| 5,815,421 A | * | 9/1998 | Dulong et al. |
| 6,078,307 A | * | 6/2000 | Daly |
| 6,108,038 A | * | 8/2000 | Sugiura et al. |
| 6,195,125 B1 | * | 2/2001 | Udagawa et al. |

OTHER PUBLICATIONS

John E. Greivenkamp, Feb. 10, 1990, Applied Optics, Color dependent optical prefilter for the suppression of aliasing artifacts, pp. 676–684.*

J.E. Greivenkamp, *Color dependent optical prefilter for the suppression of aliasing artifacts*, Applied Optics, vol. 29, pp. 676–684, Feb. 10, 1990.

* cited by examiner

*Primary Examiner*—Edward Coles
*Assistant Examiner*—Tia Carter
(74) *Attorney, Agent, or Firm*—Robert D. Varitz, P.C

(57) ABSTRACT

A method for super-resolution scanning in a image capturing device includes capturing a first color component of the image at one-half of a full resolution, capturing a first luminance component at one-half of the full resolution, and generating a first color-luminance output signal therefrom; capturing a second luminance component of the image at the full resolution and generating a luminance output signal therefrom; capturing a second color component of the image at one-half the full resolution, capturing a third luminance component of the image at one-half the full resolution, and generating a second color-luminance output signal therefrom; converting the first and second luminance components of the first and second color-luminance output signals and the third luminance component signal to a luminance component signal of 2X full resolution; and processing the full resolution output signals and the 2X full resolution output signal to form a combined output signal. A system for super-resolution scanning in a image capturing device includes a sensor array having a first row with first color pixel capturing elements which alternate with first luminance pixel capturing elements; a second row having second luminance pixel capturing elements; a third row with second color pixel capturing elements which alternate with third luminance pixel capturing elements; and a processing mechanism for transforming the first and second color components into full resolution color components and for transforming the luminance components into a 2X full resolution luminance component.

13 Claims, 2 Drawing Sheets

SUPER RESOLUTION SCANNING USING COLOR MULTIPLEXING OF IMAGE CAPTURE DEVICES

FIELD OF THE INVENTION

This invention relates to document scanning for copier, scanner, and facsimile, etc., and specifically to a method and system for increasing resolution therein without the requirement of providing more sensing elements.

BACKGROUND OF THE INVENTION

Prior art scanners generally employ a red-green-blue (RGB) sensor array to capture an image as shown in FIG. 1, generally at 10. Each array has three channels, including a red channel 12, a green channel 14 and a blue channel 16. All three channels have the same number of detector, or sensor, elements, such as sensors 18, 20 and 22. The three channels each generate a signal, which signals are combined to form a color image. This approach does not take advantage of the human vision system (HVS), wherein the bandwidth for chrominance signals is significantly lower than that of the luminance signal. A full resolution RGB scanner captures redundant information. In fact, the first step of many image processing algorithms is to remove this redundancy by converting the RGB signal to luminance-chrominance-chrominance (LCC), and sub-sampling the chrominance channels reduce this redundancy, as by JPEG compression, or other well known techniques as used in color television or copiers.

Most commercially available scanners capture color images using three sensors: red (R), green (G), and blue (B). For most desktop scanners, this is accomplished with a 3-row CCD sensor, wherein each sensor row has a number of sensors therein. Each row is offset in the slow scan direction, or sub-direction, i.e., the direction of scan bar movement, by a few scanlines, and each row of sensors is responsible for capturing only one color. The captured data are recombined digitally to form an RGB image. The three RGB sensors typically have the same number of sensors which are aligned in the slow scan direction, indicated by arrow 24 in FIG. 1. Scanning resolution is determined by the spacing between two adjacent sensor elements and the optical magnification. In order to achieve high resolution, more sensor elements are used, which results in an increased resolution from the original 75 dpi to 300 dpi and now, in some instances, up to 600 dpi, however, adding more sensor elements is expensive, and other resolution enhancement methods have been explored.

A number of patent references are known which use color multiplexing to improve resolution. Nearly all of those are for 2D video or digital still cameras where color filter arrays (CFA) are used to derive 2D color images from a single 2D CCD sensor. However, because of the inherent difficulty associated with sampling in a 2D arrangement, it is difficult, if not impossible, to implement super sampling of luminance in this type of device.

U.S. Pat. No. 4,575,769 to Arnoldi, for Variable resolution scanning in line scan optical imaging system, granted Mar. 11, 1986, discloses a method of improving resolution by advancing a document past a horizontal image scanner in defined sequences of half and full steps, half steps causing the document to be feed wise advanced by one four-hundredth of an inch, as in 400 dpi mode, full steps causing the document to be feed wise advanced by one two-hundredth of an inch (as in 200 dpi mode). This technique improves resolution only in the slow scan direction, not the fast scan direction, i.e., parallel to the CCD array.

U.S. Pat. No. 4,877, 310 to Seachman et al., for Electronically variable MTF filter for image sensor arrays, granted Oct. 31, 1989, describes placement of a MTF filter between a lens and an imaging array to reduce image modulation to blur the image prior to further processing.

U.S. Pat. No. 5,045,932 to Sharman, et. al., for Method and apparatus for generating a high definition electronic signal from a line scan of a color original, granted Sep. 3, 1991, describes a motion picture film scanner that generates a high definition television signal from the combination of a high definition luminance component and a plurality of lower definition color components. The color sensors can have large sensor apertures resulting in better signal-to-noise ratio. This system uses four sensor arrays, and is considered to be too complex and too expensive for low cost desktop scanners.

U.S. Pat. No. 5,159,469 to Takagi, for Moire removing device for image scanner, granted Oct. 27, 1992, describes a movable filtering mechanism to focus and defocus an image at an array plane.

U.S. Pat. No. 5,262,631 to Yamamoto, et al., for Color image reading apparatus, granted Nov. 16, 1993, employs a two-row sensor, one to capture green and the other to capture red and blue with alternative red and blue sensors. The green row is shifted one-half pixel in relation to the red/blue row. This device is a RGB capturing device, and does not have the bandwidth advantage associated with LCC capture.

U.S. Pat. No. 5,767,987 to Wolff, et. al., for Method and Apparatus for combining multiple image scans for enhanced resolution, granted Jun. 16, 1998, discloses a method of generating an enhanced resolution image from multiple low resolution images. One of the images is used as a prototype image, which is interpolated to higher resolution. The other images are then registered with the prototype image and the pixel values are changed iteratively based on the images data of the additional images. This technique works because the inherent jitter error of a scanner introduces more sampling points, which may be used to improve resolution. This method requires multiple scans and intensive processing.

U.S. Pat. No. 5,773,814 to Phillips, et al., for Sensor assembly providing gray scale and color for an optical image scanner, granted Jun. 30, 1998, uses Y and W interleaved on one ID array and G and C on another. The stated purpose of this technique is to optimize light collection and maximize SNR to allow for faster scan times, not to improve the image resolution. There is no shift, or misalignment, between sensor arrays.

All these prior art approaches address the resolution problem differently. Most of them do not take advantage of the human color vision, where chrominance bandwidth is significantly less than that of luminance, or used the properties of the HVS as a way of reducing bandwidth, instead of enhancing resolution.

SUMMARY OF THE INVENTION

A method for super-resolution scanning in a image capturing device includes capturing a first color component of the image at one-half of a full resolution, capturing a first luminance component at one-half of the full resolution, and generating a first color-luminance output signal therefrom; capturing a second luminance component of the image at the full resolution and generating a luminance output signal therefrom; capturing a second color component of the image at one-half the full resolution, capturing a third luminance component of the image at one-half the full resolution, and generating a second color-luminance output signal therefrom; converting the first and second luminance components of the first and second color-luminance luminance output signals and the third luminance component signal to a luminance component signal of 2X full resolution; and processing the full resolution output signals and the 2X full resolution output signal to form a combined output signal.

A system for super-resolution scanning in a image capturing device includes a sensor array having a first row with first color pixel capturing elements which alternate with first luminance pixel capturing elements; a second row having second luminance pixel capturing elements; a third row with second color pixel capturing elements which alternate with third luminance pixel capturing elements; and a processing mechanism for transforming the first and second color components into full resolution color components and for transforming the luminance components into a 2X full resolution luminance component.

An object of the invention is provide a scanner which uses color interleaving with three one-dimensional sensors, where one sensor captures only the luminance, Y, and the other two have R interleaved with Y, or B interleaved with Y and the luminance sensor (Y) is shifted half pixel in relation to R/Y and Y/B.

Another object of the invention is to provide a scanner which uses color multiplexing to improve resolution.

Another advantage of this invention is aliasing reduction using super sampling.

Other objects and advantages of the invention will become more fully apparent as the description which follows is read in conjunction with the drawings.

DETAILED DESCRIPTION OF THE PREFERRED EMBODIMENT

This invention discloses a method and system to reduce sampling redundancy of prior art RGB scanners by capturing color images in an opponent space luminance-chrominance-chrominance (LCC), where a greater number of sensor elements are used to capture luminance information than are used to capture chrominance information. The invention uses a three-row, 300 dpi charge coupled device (CCD) array to capture luminance at a 600 dpi resolution. This increased resolution improves scanned text quality, and reduces aliasing generally caused by insufficient sampling. The advantages of this method over capturing RGB at 600 dpi are (1) a scanner may operate at a lower data rate, thus reducing storage and bandwidth requirements; (2) A scanner incorporating the invention will produce less aliasing because the effective sensor aperture is larger than the sampling interval, whereas convention, prior art RGB scanners always have an aperture which is smaller than the sampling interval; (3) the scanner has a higher signal-to-noise ratio because of the larger aperture, i.e., 300 dpi pitch vs. 600 dpi pitch; (4) the scanner has a higher scanning speed because of the lower data rate and the higher signal-to-noise ratio; (5) the scanner more closely approximates the human visual system, wherein the chrominance bandwidth is lower than luminance bandwidth; and (6) the scanner requires less complex processing than prior art monochrome or color scanners.

Figure 1:
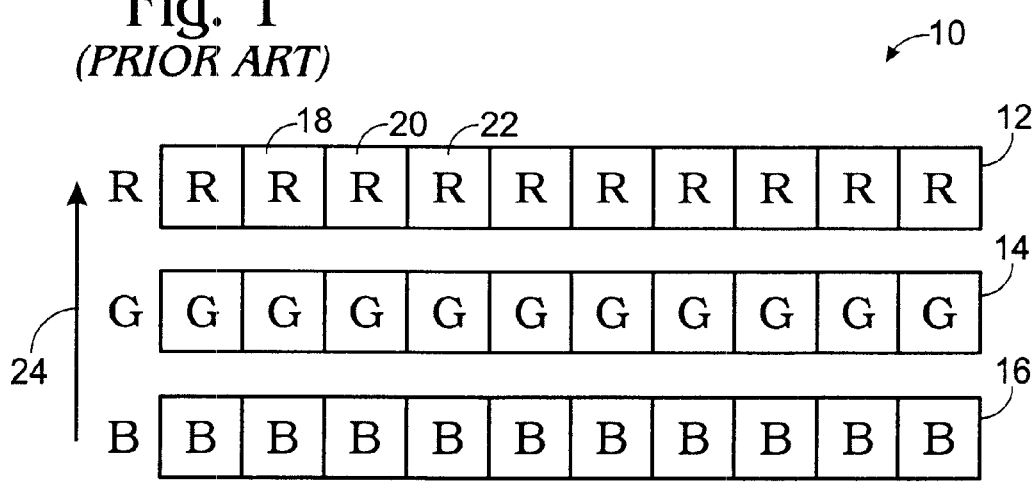
FIG. 1 depicts a convention scanning sensor array.
Figure 2:
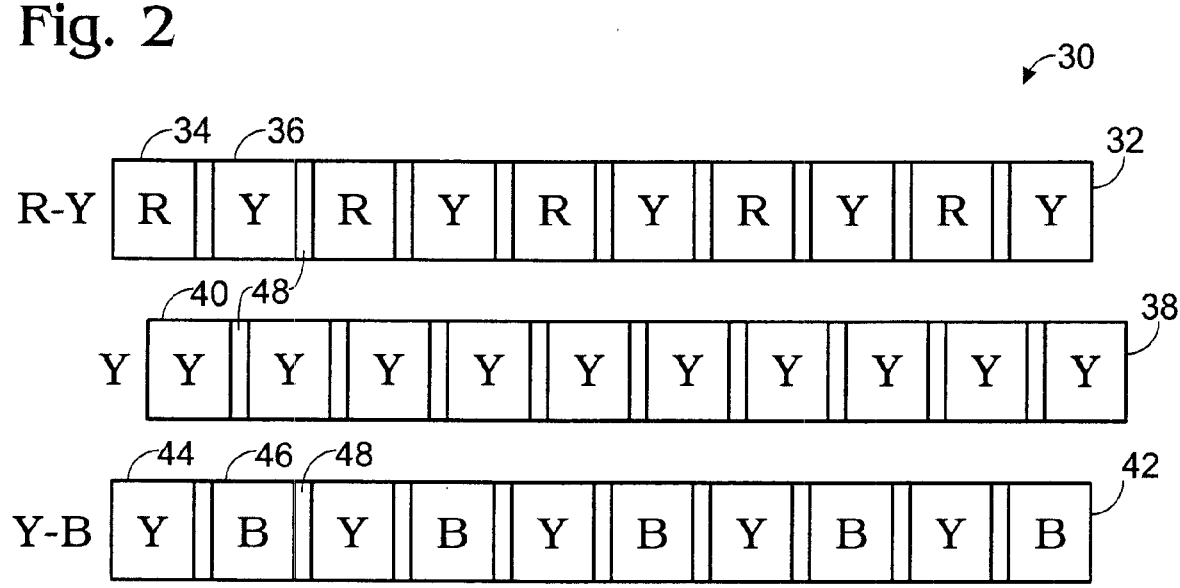
FIG. 2 depicts the sensor array of the invention.

A sensor array of the invention is shown, rather schematically, in FIG. 2, generally at 30. Sensor array 30 is arranged into, in the preferred embodiment, three rows of sensors, also referred to herein as sensor elements or pixel capturing elements. The sensor elements in the three rows define multiple columns of sensor elements. Each sensor element detects a single pixel of an image. A first row 32 includes alternate, or interleaved, red (R) sensors 34 and luminance (Y) sensors 36, arranged in a RYRYRY . . . order. Red sensor elements are referred to herein as first color component sensor elements, which sense a first color component at one-half full resolution. The Y sensor elements in first row 32 are referred to herein as first luminance component sensors which sense a first luminance component at one-half full resolution. In the case where the scanner is designed to operate at 300 dpi, each row will contain 300 sensor elements per inch. A second row 38 includes sensors that are all Y sensors 40, which are shifted one-half pitch, i.e., one-half pixel width, in relation to the first and third rows. Luminance sensor elements in second row 38 are referred to as second luminance component sensors which sense a second, full resolution, luminance component. A third row 42 includes interleaved Y sensors 44 and B (blue) sensors 46, which are aligned with the sensors in first row 32, and are arranged in a YBYBYB . . . order. Blue sensor elements in third row 42 are referred to herein as second color component sensors which sense a second color component at one-half full resolution. The Y sensor elements in third row 42 are referred to herein as third luminance component sensors which sense a third luminance component at one-half full resolution. The Y sensors in first row 32 (RY) or third row 42 (YB) are aligned to fill in a gap 48 in second row 38, which about a tenth of pixel, between the two neighboring Y sensors in the second row (Y), which, in effect, doubles the sampling resolution of luminance. Gap 48 is a result of manufacturing techniques, which require that there be some space between individual sensors. Gap 48 is very small, but exists in prior art sensors and in the sensor of the invention. Note that first row 32 first color component sensor (R) 34 is aligned with third row 42 third luminance component sensor 44, and that the second color component sensor elements of third row 42 are aligned with first luminance component sensor element 36. Because the sampling interval is smaller than the sensor aperture, i.e., the active area of a detector, aliasing caused by insufficient sampling can be greatly reduced.

Figure 3:
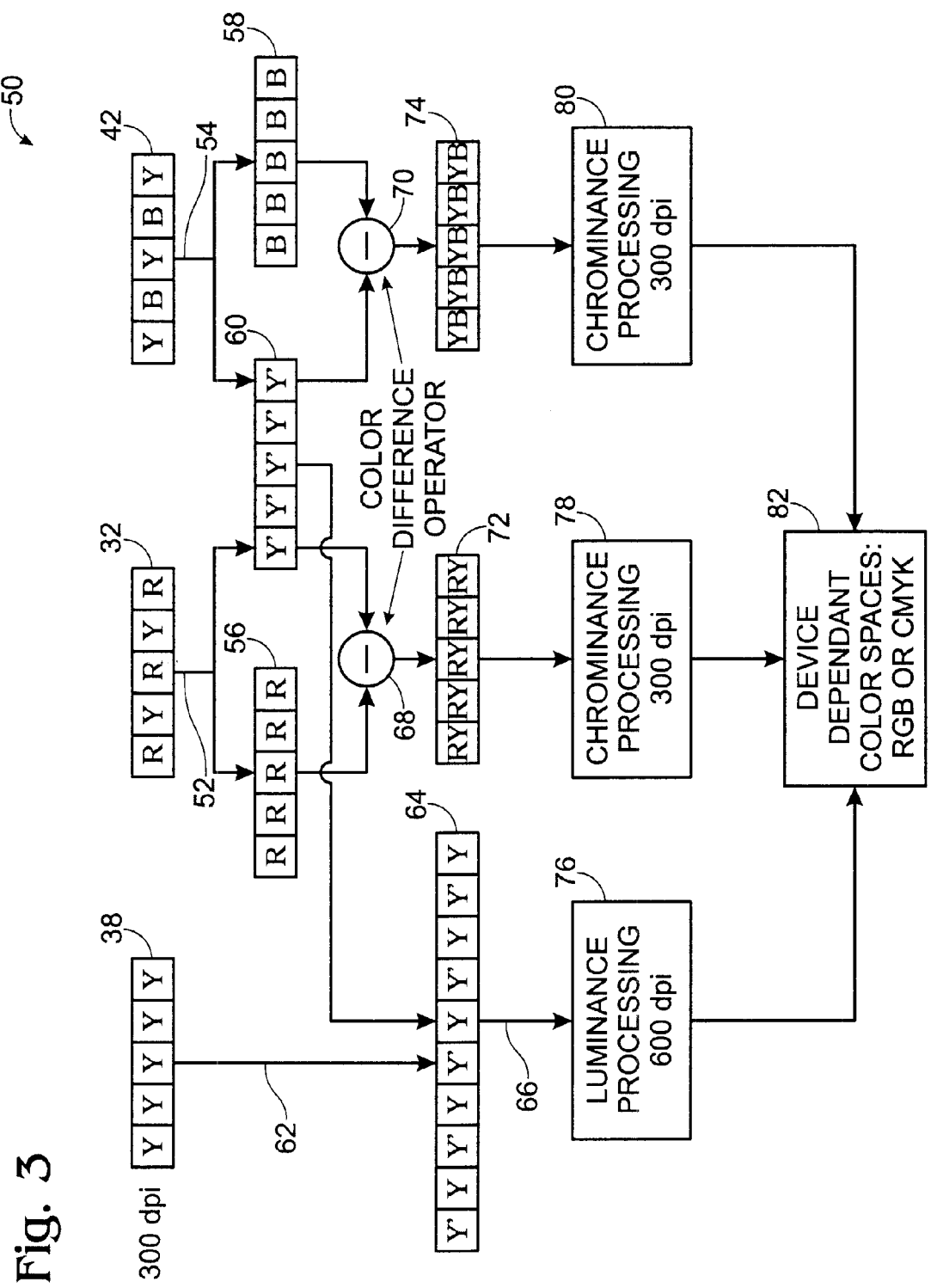
FIG. 3 is a block diagram of the method of the invention used to derive a high resolution color image from the sensor array of FIG. 2.

FIG. 3 illustrates the method of the invention, shown generally at 50, which is used to derive super resolution (600 dpi) luminance image from captured 300 dpi RY, Y, and YB signals. A half resolution RY signal 52 and a half resolution YB signal 54 are first resolution enhanced to a full resolution R signal 56 and a full resolution B signal 58 using linear interpolation, or other interpolation techniques. The Y component from RY signal 52 and the Y component from YB signal 54 forms a full resolution Y' signal 60 at 300 dpi. A full resolution Y signal 62 is generated by second row 38. The difference between Y and Y' is that Y is offset by a one-half pixel. By combining Y and Y', a super resolution luminance signal 64 is obtained, which is convertible into a super resolution luminance image 66. Full resolution interpolated R signal 56 and B signal 58 are sent to color difference operators 68, 70, respectively, to derive a R-Y' chrominance signal 72 and a Y'-B chrominance signal 74. The luminance-chrominance-chrominance (LCC) signals may then be converted to RGB by, respectively, luminance processor 76 and chrominance processors 78, 80, for display or CMYK for printing, block 82. In most cases, image processing such as filtering, tone scale enhancement, etc are applied to the LCC image before it is displayed or printed. Although Y is referred to as luminance in this disclosure, it may be green, or yellow, or even white.

To prevent chrominance aliasing caused by under-sampling of R and B, a color anti-aliasing filter, as described by J. E. Greivenkamp, in Color dependent optical prefilter for the suppression of aliasing artifacts, Applied Optics, Vol. 29, pp 676–684, Feb. 10, 1990, may be inserted into the optical path, which will blur only long and short wavelength light, but will not blur the mid wavelength light. This will also blur the luminance, however, not as much as the chrominance channels.

Thus, a scanner system and method have been described which uses color interleaving with three one-dimensional sensors rows, where one sensor captures only the luminance (Y), and the other two sensor rows have red interleaved with Y, or blue interleaved with Y, and wherein the Y sensor is shifted half pixel in relation to the R/Y and Y/B sensor rows. The invention uses color multiplexing to improve resolution.

The method and apparatus of the invention may be applied to CCD sensors for scanner, copier, and facsimile applications, and may also be applied to CMOS and other light-sensitive sensors which are used for scanning color images.

Although a preferred embodiment of the invention has been disclosed herein, it should be appreciated that other variations and modification may be made thereto without departing from the scope of the invention as defined in the appended claims.

I claim:

1. A method for super-resolution scanning in a image capturing device comprising:
   capturing a first color component of the image at one-half of a full resolution, capturing a first luminance component at one-half of the full resolution, and generating a first color-luminance output signal therefrom;
   capturing a second luminance component of the image at the full resolution and generating a luminance output signal therefrom;
   capturing a second color component of the image at one-half the full resolution, capturing a third luminance component of the image at one-half the full resolution, and generating a second color-luminance output signal therefrom;
   converting the first and second luminance components of the first and second color-luminance output signals and the third luminance component signal to a luminance component signal of 2X full resolution; and
   processing the full resolution output signals and the 2X full resolution output signal to form a combined output signal.

2. The method of claim 1 which further includes arranging multiple rows and multiple columns of pixel capturing elements in a sensor array to capture and image at a predetermined, full resolution, and wherein said arranging includes offsetting the pixel capturing elements for the row that captures the second luminance component by one-half of a pixel width.

3. The method of claim 2 wherein said processing includes processing the combined output signal to form a RGB output signal.

4. The method of claim 2 wherein said processing includes processing the combined output signal to form a CMYK output signal.

5. The method of claim 2 wherein said processing includes processing the combined output signal to form a CMY output signal.

6. A method for super-resolution scanning in a image capturing device comprising:
   arranging multiple rows and multiple columns of pixel capturing elements in a sensor array to capture an image at a predetermined, full resolution;
   capturing, in a first row and in alternate columns thereof, a first color component of the image at one-half the full resolution, capturing a first luminance component of the image in the remaining columns of the first row, and generating a first color-luminance output signal therefrom;
   capturing, in a second row, a second luminance component of the image at the full resolution and generating a second luminance component output signal therefrom, wherein said arranging, for the second row, includes offsetting the pixel capturing elements by one-half of a pixel width;
   capturing, in a third row and in alternate columns thereof, a second color component of the image at one-half the full resolution, capturing a third luminance component of the image in the remaining columns thereof, and generating a second color-luminance output signal therefrom; and
   converting the first and second color-luminance signals to full resolution first and second color component signals
   converting the first and second color-luminance signals to a full resolution luminance component signal and combining the full resolution luminance component signal with the second luminance component output signal to form a 2X full resolution luminance output signal; and
   output processing full resolution signals color component output signals and the 2X full resolution luminance output signal to form a combined output signal.

7. The method of claim 6 wherein said output processing includes processing the combined output signal to form a RGB output signal.

8. The method of claim 6 wherein said output processing includes processing the combined output signal to form a CMYK output signal.

9. The method of claim 6 wherein said processing includes processing the combined output signal to form a CMY output signal.

10. A system for super-resolution scanning in a image capturing device comprising:
    a sensor array having multiple rows and multiple columns of pixel capturing elements therein, including:
    a first row having first color pixel capturing elements for capturing a first color component of the image at one-half of a full resolution, which alternate with first luminance pixel capturing elements for capturing a first luminance component of the image at one-half of a full resolution;
    a second row having second luminance pixel capturing elements for capturing a full resolution, second luminance component of the image, wherein said second luminance pixel capturing elements are offset from pixel capturing elements in the first and third rows by one-half pixel width;
    a third row having second color pixel capturing elements for capturing a second color component of the image at one-half of a full resolution, which alternate with third luminance pixel capturing elements for capturing a third luminance component of the image at one-half of a full resolution, wherein said first color pixel capturing elements are aligned with said third luminance pixel capturing elements; and a processing mechanism for transforming the half resolution first and second color components into full resolution color components and for transforming said first, second and third luminance components into a 2X full resolution luminance component.

11. The system of claim 10 which includes an output mechanism for providing a RGB output.

12. The system of claim 10 which includes an output mechanism for providing a CMYK output.

13. The system of claim 10 which includes an output mechanism for providing a CMY output.

\* \* \* \* \*